United States Patent [19]
Rich et al.

[11] 3,811,095
[45] May 14, 1974

[54] ELECTRIC-DISCHARGE EXCITED GASEOUS LASER

[75] Inventors: Joseph W. Rich, East Aurora; Charles E. Treanor; John W. Daiber, both of Williamsville, all of N.Y.

[73] Assignee: Calspan Corporation, Buffalo, N.Y.

[22] Filed: June 20, 1972

[21] Appl. No.: 264,682

[52] U.S. Cl. ................................ 331/94.5, 330/4.3
[51] Int. Cl. ............................................. H01s 3/00
[58] Field of Search ...................... 331/94.5; 330/4.3

[56] References Cited
UNITED STATES PATENTS
3,543,179  11/1970  Wilson ............................... 331/94.5

Primary Examiner—Ronald L. Wibert
Assistant Examiner—R. J. Webster
Attorney, Agent, or Firm—Allen J. Jaffe

[57] ABSTRACT

A diatomic molecular laser having an electrical gas discharge for increasing the vibrational energy of the gas and a supersonic expansion nozzle for reducing the translational temperature of the gas and optically aligned reflecting surfaces in the walls of the supersonic nozzle in communication with the electrical gas discharge.

5 Claims, 2 Drawing Figures

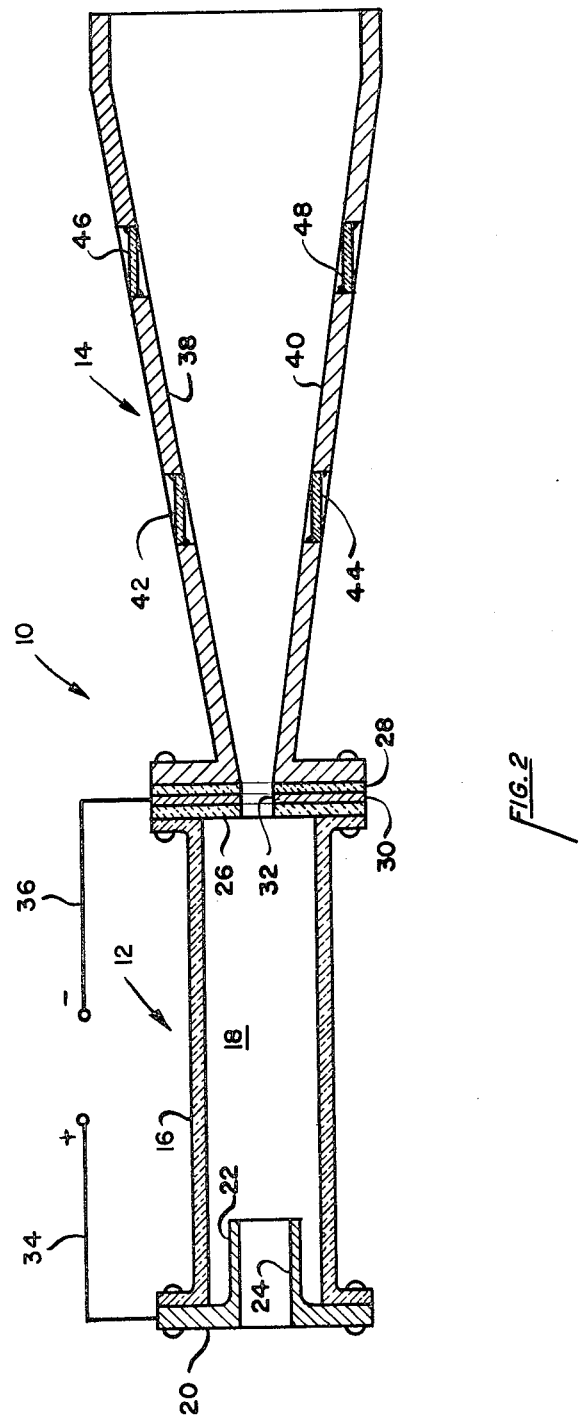

ELECTRIC-DISCHARGE EXCITED GASEOUS LASER

BACKGROUND OF THE INVENTION

The present invention relates to gaseous lasers and, more particularly, to diatomic molecular lasers.

Recent studies of certain diatomic molecular lasers such as CO have clarified the energy transfer mechanisms responsible for the observed population inversions among the vibration-rotation bands. It has been demonstrated that rapid exchange of vibrational energy during collisions between CO molecules is responsible for creating a markedly non-Boltzmann distribution of vibrational level populations and, therefore, the population inversions necessary for lasing to occur. This mechanism has, heretofore, occurred in direct-discharge-excited CO lasers and in thermally-excited gas dynamic lasers. The extent of population inversions of the above type requires an increase in the amount of energy in the vibration mode and/or a decrease in the translational temperature of the gas.

In the direct electrical gas discharge CO lasers it is necessary to provide cryogenic cooling of the discharge tube walls to lower the translational temperature of the gas. In addition to being costly and requiring a cryogenic flow system this type of laser system has produced inversions only in upperlying vibrational states at wavelengths which make for very inefficient transmission through the atmosphere. This seriously lessens the utility of such systems for communications and other atmospheric transmission applications.

Thermally excited CO lasers are known which to some extent overcome the above noted disadvantages. These involve the utilization of a shock tube to thermally excite the gas to temperatures of about 2,000° K combined with a supersonic nozzle to expand the gas to translational temperatures of about 50° K. Although this type of system produces laser radiation of bands below 5.0 microns in CO which can be efficiently transmitted through the atmosphere, the major disadvantage of this type of system is its extremely low efficiency, about 0.2 percent. This is because the method of thermal excitation employed results in the bulk of the input power being expended in non-useful heating of the translational and rotational energy modes of the gases. An additional disadvantage in this type of thermally excited molecular laser is that the short run times and the experimental complications associated with shock tube operation make diagnostic experiments and systematic optimization studies difficult.

SUMMARY OF THE INVENTION

The foregoing disadvantages, as well as others, are overcome according to the teachings of the present invention which provides an apparatus for obtaining powerful multiline lasing from gas molecules, which apparatus is reasonably efficient and compact.

The apparatus of the present invention incorporates an electrical discharge as a means to vibrationally excite the gas combined with a supersonic nozzle to expand the gas to low translational temperatures. The excitation is efficient since energy is not wasted in increasing the translational temperature of the gas as is the case with the thermally excited system. Also the low translational temperatures required for lasing are achieved without dependence on a complex and costly wall-cooling system as is the case with the conventional direct-discharge-excited systems.

Basically, then, the present invention comprises means providing an electrical discharge having a pair of spaced electrodes and a gaseous fluid, a supersonic converging-diverging nozzle coacting with the electrical discharge and reflecting and partially reflecting elements located in the walls of the supersonic nozzle.

BRIEF DESCRIPTION OF THE DRAWING

For a fuller understanding of the present invention, reference should now be had to the following detailed description thereof taken in conjunction with the accompanying drawings wherein;

FIG. 2 is a schematic sectional view taken along line 2 — 2 of FIG. 1.

DESCRIPTION OF THE PREFERRED EMBODIMENT

Figure 1:
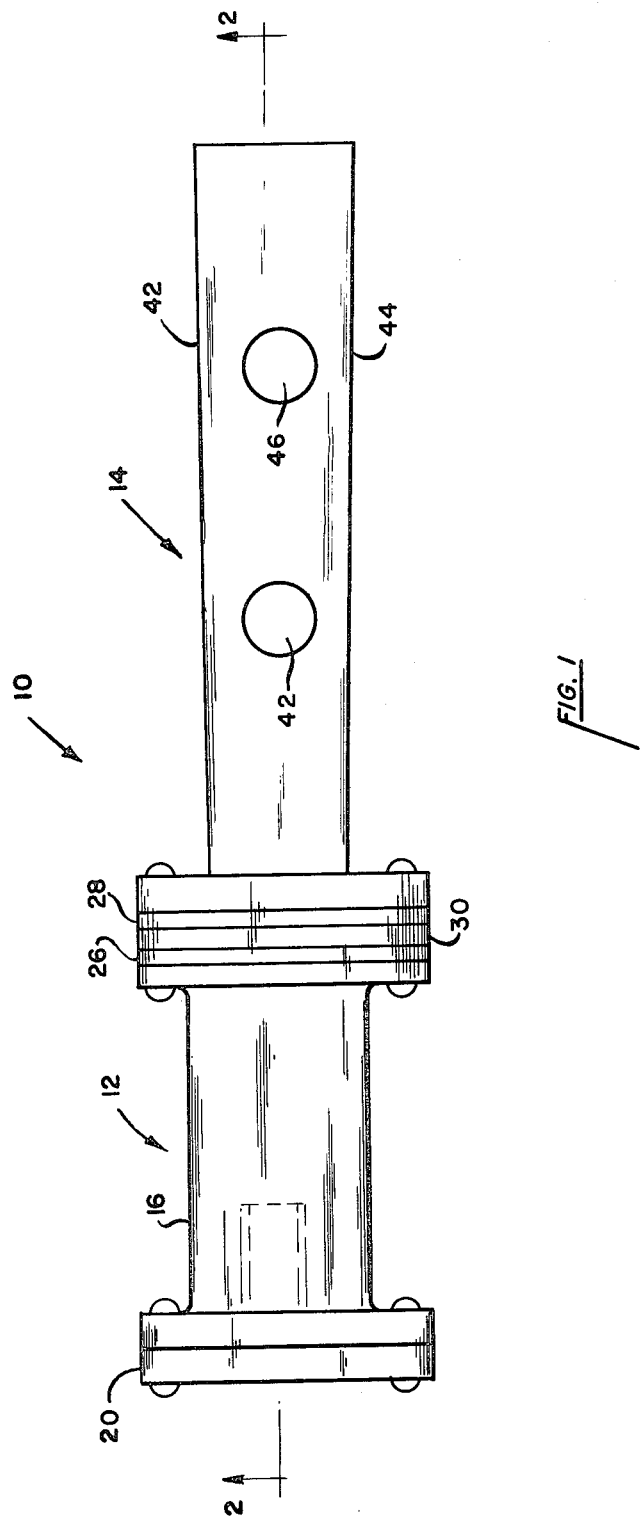
FIG. 1 is a schematic elevational view of the apparatus according to the present invention.

Referring to the drawings the molecular gas laser according to the present invention is generally depicted by the numeral 10 and comprises a discharge tube generally depicted at 12 and a supersonic expansion nozzle generally depicted at 14.

Discharge tube 12 is illustrated schematically as comprising a cylindrical body 16 fabricated of glass or the like which body defines an interior chamber or cavity 18. Cavity 18 may be sealingly closed at its upstream end by an electrode support plate 20 which contains an annular electrode 22 projecting into cavity 18 in surrounding concentric relation to an inlet gas passage 24.

Expansion nozzle 14 is suitably affixed to the downstream end of discharge tube 16. A pair of insulating discs 26 and 28 and an electrode disc 30 are located between nozzle 14 and the downstream end of tube 16 and have central aligned openings or ports which define a throat 32 for the nozzle 14.

Electrodes 22 and 30 are adapted to be energized from a suitable source of potential (not illustrated) through leading wires 34 and 36. As illustrated electrode 30 serves as a cathode and electrode 22 serves as an anode. Electrodes 22 and 30 may be watercooled as is conventional.

The expansion nozzle proper is basically a two dimensional wedge type structure comprising a pair of planar side walls 38 and 40 which diverge from the throat 32 in downstream direction. Walls 38 and 40 are joined by a pair of transverse walls 42 and 44 which have a slight divergence as illustrated in FIG. 1. Sidewalls 38 and 40 may contain one or more pairs of optical windows at predetermined locations downstream of throat 32. Such windows may take the form of optically aligned mirrors 42 and 44 one of which is fully reflective and the other of which in addition to being reflective also has means to transmit radiation therethrough either by openings or absorption as is well known. Additional optically aligned windows 46 and 48 may be located at predetermined points downstream of windows 42 and 46. Although the windows are shown as parallel to each other, this is for illustrative purposes only; other angular relationships are possible so long as there is optical alignment between reflecting surfaces. Additionally, more than two reflecting surfaces may be employed in the generation of the laser radiation. As depicted schematically, the windows are suitably secured to openings in side walls 38 and 40.

Although the application and operation of the laser apparatus will now be discussed as a CO molecular laser, it is to be understood that other diatomic molecular gases can be advantageously employed so long as their vibration to vibration energy exchange rates are greater than their vibration to translation or rotation energy exchange rates.

Gas, CO and He for example, is fed into cavity 18 through inlet passage 24 from a suitable source (not illustrated). A voltage potential across electrodes 22 and 30 is applied of sufficient magnitude to initiate a glow discharge in the gas which greatly increases, through electronic collisions, the vibrational energy thereof. A pressure differential is established across throat 32 sufficient to establish a choked condition thereat. This maybe advantageously accomplished by a vacuum pump communicating with the downstream end of nozzle 14, as is conventional. With the flow at the throat choked the gases undergo a supersonic expansion in the nozzle which results in a very rapid cooling or reduction in translational temperature while still maintaining the high vibrational energies imparted by the discharge tube. With a lowering of the translational temperature upper energy levels of the CO molecule are populated to a greater extent than the lower states and lasing results at the location of the windows. The wavelength of the radiation being a function of the translational temperature, multi-line or multiwavelength lasing is possible by the placement of the windows at locations in the nozzle where the translational temperatures are different.

In CO radiation wavelengths have been observed at from 4.85 to 5.80 microns in a laser apparatus having the following typical parameters:

Static pressure in the discharge — 200 mm Hg.
Gas composition — 15% CO, 0.5% $O_2$, 84.5% He.
Discharge voltage — 26 kv
Discharge current — 75 ma
Expansion half angle of wedge nozzle — 15°
Distance of optical axis from nozzle throat — 40 cm Nozzle throat area — 1.33 $cm^2$
Reflectivity of output coupling mirror — 85 percent The He is provided to permit stable discharge operation as is well known. The $O_2$ is provided to inhibit CO dissociation as is well known.

Although a preferred embodiment of the invention has been disclosed and described other forms will obviously occur to those skilled in the art. For example, various other types of electrical glow discharges, such as a transverse discharge or an electron beam initiated discharge, may be incorporated. Additionally, the discharge may be located in the supersonic nozzle structure since it is immaterial whether the gas undergoes a rapid expansion prior to or subsequent to its excitation by the discharge so long as the discharge is in fluid communication with the reflecting surfaces of the laser. Also the operation of the discharge could be pulsed or continuous. It is intended, therefore, that the present invention is to be limited only by the scope of the appended claims.

We claim:

1. A diatomic molecular gas laser, comprising;
    a. a diatomic molecular gas,
    b. means providing an electrical glow discharge in said gas for exciting the vibrational energy levels thereof which means comprises a pair of spaced electrodes,
    c. an expansion nozzle having a throat section and a diverging section adjacent thereto,
    d. means adapted to establish a pressure differential across said throat section sufficient to establish a choked condition thereat whereby said gas undergoes a supersonic expansion through said nozzle from said throat section to said diverging section to thereby reduce the translational temperature of said gas causing a population inversion thereof; and
    e. means optically coupled with said diverging section for stimulating the emission of radition from said gas.

2. The apparatus according to claim 1, wherein;
    f. said electrical discharge is located in a chamber adjacent an end of said throat section which is remote from an end thereof that is adjacent said diverging section.

3. The apparatus according to claim 2, wherein;
    g. said nozzle has a central longitudinal axis, and
    h. said electrodes having openings, the axes of which are substantially parallel to said central longitudinal axis.

4. The apparatus according to claim 2, wherein;
    g. said means for stimulating comprises optically aligned surfaces located in opposed and spaced wall portions of said diverging section.

5. The apparatus according to claim 1, wherein;
    f. said means for stimulating comprises optically aligned surfaces located in opposed and spaced wall portions of said diverging section.

* * * * *